United States Patent
Urdang

(10) Patent No.: US 9,674,040 B2
(45) Date of Patent: Jun. 6, 2017

(54) NETWORK TOPOLOGY DISCOVERY AND OBSOLESCENCE REPORTING

(75) Inventor: Erik Gwyn Urdang, Boulder, CO (US)

(73) Assignee: Level 3 Communications, LLC, Broomfield, CO (US)

(*) Notice: Subject to any disclaimer, the term of this patent is extended or adjusted under 35 U.S.C. 154(b) by 468 days.

(21) Appl. No.: 13/599,482

(22) Filed: Aug. 30, 2012

(65) Prior Publication Data

US 2014/0064138 A1 Mar. 6, 2014

(51) Int. Cl.
*H04L 12/24* (2006.01)

(52) U.S. Cl.
CPC ...... *H04L 41/0856* (2013.01); *H04L 41/0813* (2013.01); *H04L 41/14* (2013.01); *H04L 41/06* (2013.01); *H04L 41/0806* (2013.01)

(58) Field of Classification Search
CPC ..... H04L 67/34; H04L 41/0806; H04L 41/22; H04L 69/329; H04L 41/0893; H04L 45/00; H04L 9/0844; H04L 9/0847; H04L 9/3073; H04W 12/04; H04W 12/08; H04W 16/14
USPC ....... 709/223, 203, 220, 224, 217, 221, 226, 709/201; 370/252, 329, 254, 401, 241, 370/328, 350, 351
See application file for complete search history.

(56) References Cited

U.S. PATENT DOCUMENTS

| | | | |
|---|---|---|---|
| 2005/0047350 A1* | 3/2005 | Kantor et al. | 370/254 |
| 2010/0103838 A1* | 4/2010 | Croak et al. | 370/252 |
| 2010/0161145 A1* | 6/2010 | Baeza-Yates | G06F 1/26 700/291 |
| 2011/0271311 A1* | 11/2011 | Berger et al. | 725/100 |
| 2012/0203864 A1* | 8/2012 | Toth et al. | 709/217 |

* cited by examiner

*Primary Examiner* — Charles C Jiang
*Assistant Examiner* — Oussama Roudani

(57) ABSTRACT

Implementations of the present disclosure involve an apparatus and/or method for a network topology discovery engine that detects one or more network elements and/or one or more connections between a plurality of network elements. The network topology discovery engine transmits a request for operational and connection information from at least one network element. In response, network topology information is received by the network topology discovery engine by one or more elements of the network that provide information on the topology and operational state of the telecommunications network. The received information may then be stored in a network topology database. This network topology database may be utilized by the network or a related component for information or maintenance of the telecommunications network, such as an obsolescence tracker to detect one or more network elements that could be replaced or upgraded.

17 Claims, 9 Drawing Sheets

NETWORK TOPOLOGY DISCOVERY AND OBSOLESCENCE REPORTING

TECHNICAL FIELD

Aspects of the present disclosure relate to telecommunication networks. More particularly, aspects of the present disclosure involve an apparatus, system and/or method for remotely discovering a topology of a telecommunications network through one or more addressable network elements. Further aspects of the present disclosure involve an apparatus, system and/or method for detecting obsolete elements in a telecommunications network and reporting obsolete elements for replacement in the network.

BACKGROUND

A communication network typically employs numerous network elements for exchanging data across the network for delivery to a final destination. For example, within a typical Synchronous Optical Network (SONET), numerous types of network elements from many different vendors are interconnected with each other in very complex configurations. In addition, changes are frequently made to the network configurations and interconnections as more customers and greater communication availability is added. Consequently, maintaining an accurate record of these complicated configurations and interconnections at any point in time is a significant challenge.

To attempt to keep track of the network configuration, some network providers use provisioning databases that store data representing the configuration of the network. A significant problem that has been identified relates to inaccurate representation of the actual network configuration in the provisioning database. Generally this problem arises when changes to the network are not updated in the provisioning database or are updating incorrectly. Due to the complexity of network configurations, the large number of interconnections, and the frequency of change, the current state of a network topology can be extremely difficult to identify if the provisioning database is not updated when changes are made; and if errors are made during provisioning, the current state is not easily discernible even if the provisioning database is updated. Once connections are made between network elements, manually identifying them can be a painstaking, and time-consuming task because of the vast number of connections between the elements. Unfortunately, the provisioning database typically does not accurately reflect the actual network configuration.

If the provisioning database does not accurately reflect the actual network configuration of the network, this can pose significant problems for the network provider. For example, if equipment fails on the network, the database will not provide accurate information to enable network administrators to quickly identify the source of the problem, and fixing the problem may take much longer than necessary. In addition, customers may be billed incorrectly because of incorrect assumptions about the network configuration. Furthermore, network administrators or network monitoring systems may rely on the database to analyze and determine the elements in the network that should be updated or replaced as new elements become available. However, an inaccurate database of the elements of the network may mistakenly identify or miss those elements that are available for updating such that the network is not updated properly.

Hence, among other things, there exists a need for systems and methods for more accurately updating a database of a network topology that minimizes the potential for human error when updating the database as the network is changed. Further, there exists a need for systems and methods for utilizing the accurate database of the network topology to identify those network elements that should be updated or replaced.

SUMMARY

One implementation of the present disclosure may take the form of a method for managing a telecommunications network. The method may include the operations of transmitting a request to a first network element of a telecommunication network, the request configured to request operational attributes of the first network element and the location of the first network element, receiving the operational attributes and location of the first network element and obtaining operational attributes of a replacement network element from a database, the operational attributes of the replacement network element including at least the available bandwidth of the replacement network element. With that information, the method may further include calculating the cost of replacement of the first network element with the replacement network element, wherein the calculation of the cost includes the operational attributes and the location for the first network element and the operational attributes of the replacement network element and providing a notification to an administrator of the telecommunications network when the cost of replacement of the first network element with the replacement network element exceeds a predetermined threshold value.

Another implementation of the present disclosure may take the form of a system for managing a telecommunications network. The system includes a database configured to store topology information for a telecommunications network, the topology information comprising in identification of at least one network element, one or more operational attributes for the at least one network element and a geographic location of the at least one network element, a processor and a computer-readable device associated with the processor and including instructions stored thereon and executable by the processor. The instructions, when executed, cause the processor to retrieve the one or more operational attributes for the at least one network element and the geographic location of the at least one network element from the database and obtain one or more operational attributes of a replacement network element, the operational attributes of the replacement network element including at least the available bandwidth of the replacement network element. Once the information is retrieved, the processor calculates a value of replacement of the first network element with the replacement network element, wherein the calculation of the value includes an analysis of the operational attributes and the remoteness of the geographic location for the first network element and the operational attributes of the replacement network element and transmits a notification to an administrator of the telecommunications network when the value of replacement of the first network element with the replacement network element exceeds a predetermined threshold value.

DETAILED DESCRIPTION

Figure 1:
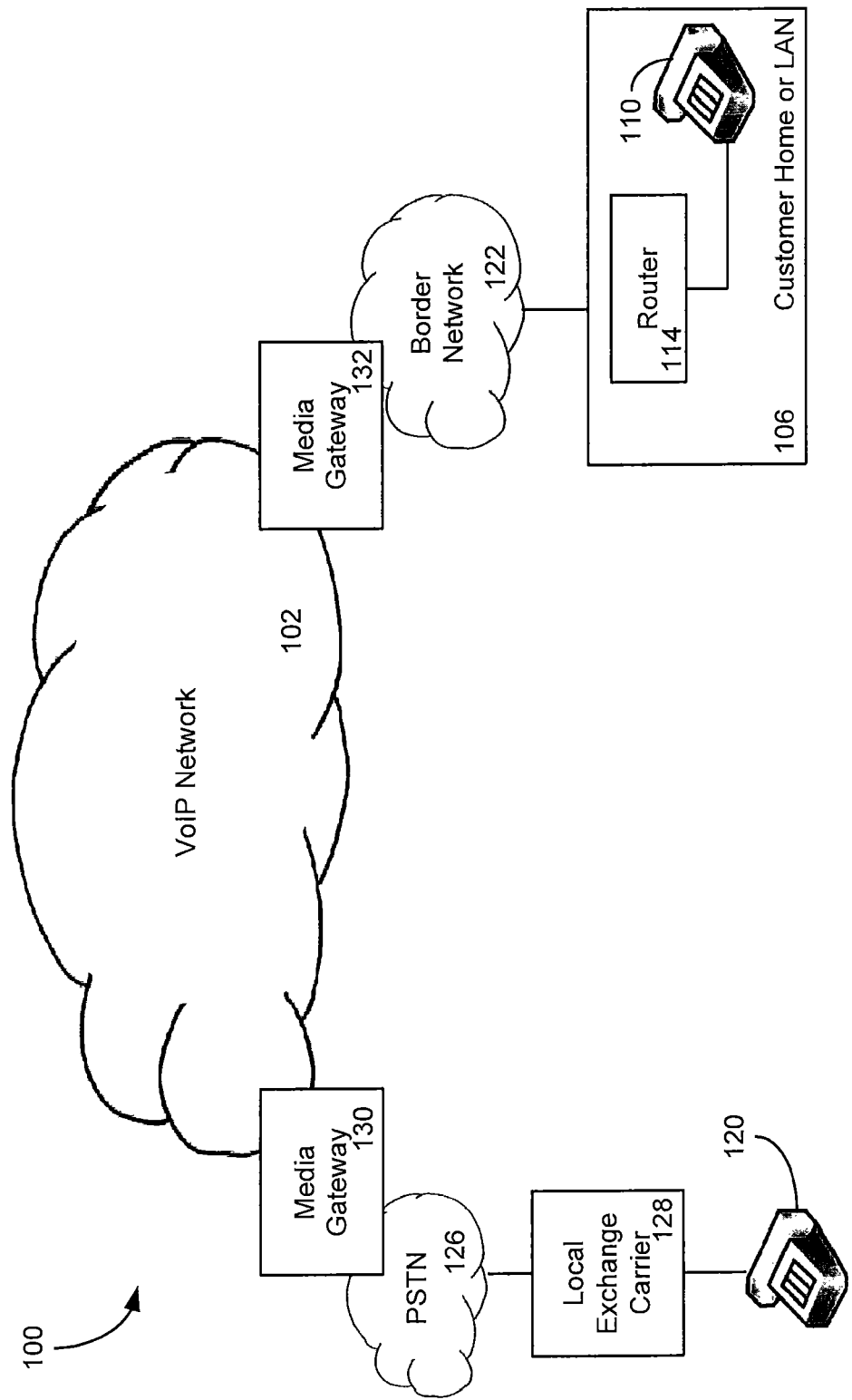
FIG. 1 is a diagram illustrating an exemplary telecommunications network including network elements that may be discovered by a network topology discovery engine.

Implementations of the present disclosure involve an apparatus, system and/or method for a network topology discovery engine that communicates with a telecommunications network to detect one or more network elements and/or one or more connections between a plurality of network elements. The discovered network elements may be addressable and/or unaddressable network elements. In general, the network topology discovery engine transmits a request for operational and connection information from at least one addressable network element over a communication link. In response, network topology information is received by the network topology discovery engine by one or more elements of the network that provide information on the topology and operational state of the telecommunications network. The received information may then be stored in a network topology database for use by the telecommunications network and/or an operating entity of the telecommunications network that provides an accurate and reliable topology of the network.

In one embodiment, the network topology discovery engine communicates with at least one network element to request information from the at least one network element. In response, the network element may provide operational information for the network element, connection information to addressable and unaddressable network elements connected to the at requested network element, operating information for one or more unaddressable network elements connected to the requested network element and/or addresses for the addressable network elements connected to the requested network element. This information may then be analyzed and stored in the network topology database by the network topology discovery engine. In another embodiment, the at least one network element may request and obtain the information described above for any number of other network elements connected to it and provide the gathered information to the network topology discovery engine for storage in the network topology database.

In addition, the network topology database describing the telecommunications network populated by the network topology discovery engine may be utilized by the network or a related component for information or maintenance of the telecommunications network. For example, an obsolescence tracker may obtain and utilize the information stored in the network topology database to aid in detecting one or more network elements that could be replaced or upgraded. In particular, the obsolescence tracker may obtain information about one or more network elements, analyze the element information in comparison to one or more variables that affect the cost of replacement or upgrading of the network element and determine if replacement of the network or maintenance on the network element should occur (or is cost effective). Upon detection of an obsolete network element, the obsolescence tracker may provide a notification of the identified obsolete element or a list of such obsolete network elements to a network administrator for consideration of replacement or upgrade.

FIG. 1 illustrates an exemplary operating environment 100 for implementing a network topology discovery engine and obsolescence tracker. The environment 100 provides for setting up communication sessions, such as a Voice over Internet Protocol (VoIP) communication session, between network users. With specific reference to FIG. 1, the environment 100 includes a telecommunications network 102 provided by a wholesale network service provider. The telecommunications network 102 includes numerous components such as, but not limited to, Voice Over Internet Protocol (VOIP) components such as gateways, routers, registrars and/or one or more Synchronous Optical Network (SONET) components such as switches, add-drop multiplexers and/or digital cross-connect systems, which enable communication across the telecommunications network 102, but are not shown or described in detail here because those skilled in the art will readily understand these components. Also relevant to this description is the interaction and communication between the telecommunications network 102 and other entities, such as the one or more customer home or business local area networks (LANs) 106.

Customer network 106 can include communication devices such as, but not limited to, a personal computer or a telephone 110 connected to a router/firewall 114. The communication and networking components of the customer network 106 enable a user at the customer network 106 to communicate via the telecommunications network 102 to other communication devices, such as another customer network and/or an analog telephone 120. Components of the customer network 106 are typically home- or business-based, but they can be relocated and may be designed for easy portability. For example, the telephone 110 may be wireless (e.g., cellular).

The customer network 106 may connect to the telecommunications network 102 via a border network 122, such as an Internet Service Provider (ISP). The border network 122 is typically provided and maintained by a business or organization such as a local telephone company or cable company. The border network 122 may provide network/communication-related services to their customers. The analog telephone 120 accesses, and is accessed by, the telecommunications network 102 via a public switched telephone network (PSTN) 126 and a local exchange carrier (LEC) 128. Communication via any of the networks can be wired, wireless, or any combination thereof. Additionally, the border network 122 and PSTN 126 may communicate, in some embodiments, with the telecommunications network 102 through a media gateway device (130, 132).

Figure 2:
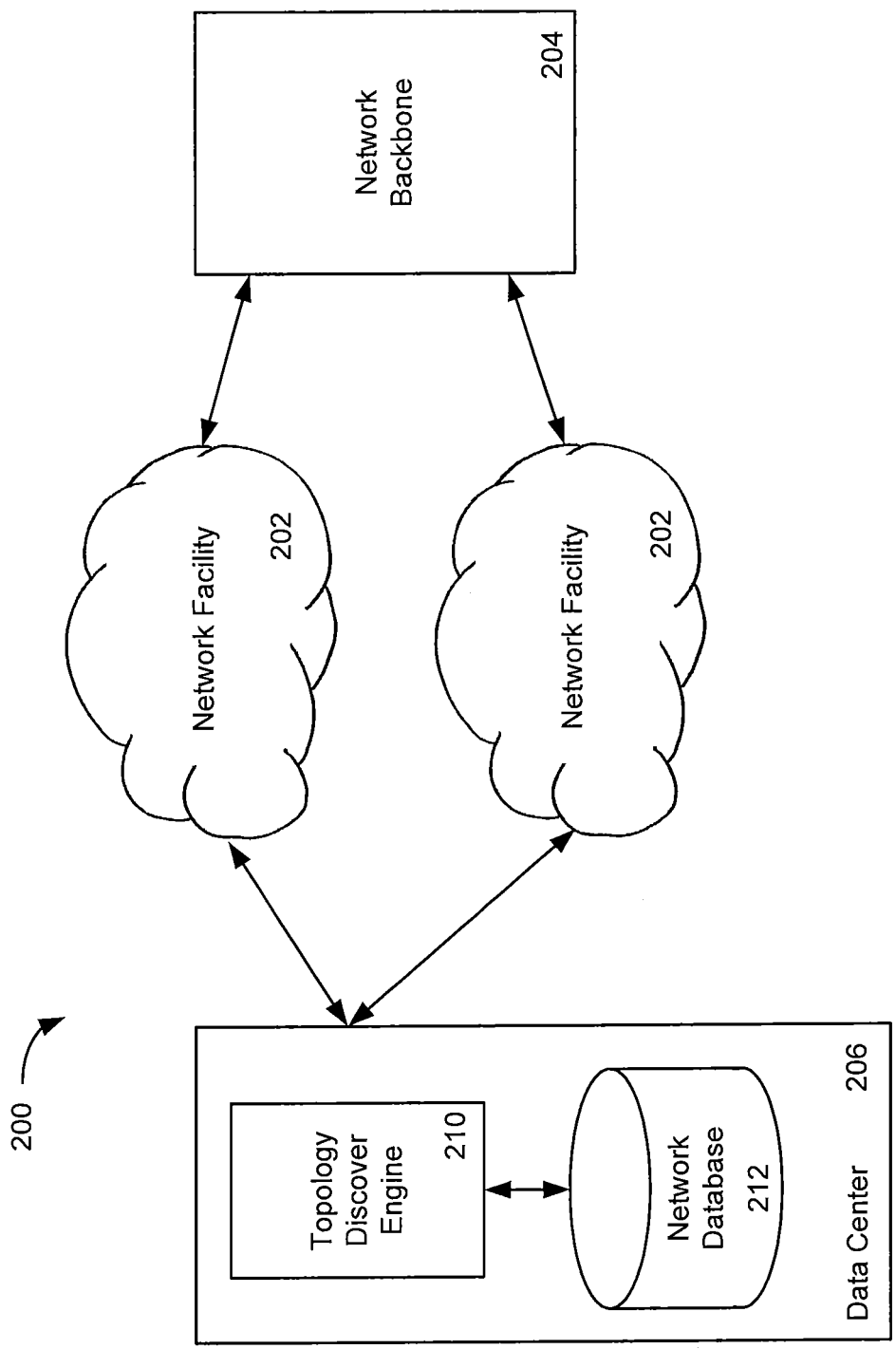
FIG. 2 is a diagram illustrating an exemplary network environment for carrying out network topology discovery utilizing a network topology discovery engine.

FIG. 2 is a diagram illustrating an exemplary network environment 200 for carrying out network topology discovery utilizing a network topology discovery engine 210. The exemplary operating environment represents a portion of a telecommunications network operated by a network provider that includes any number of exemplary network elements interconnected with optical fibers or other communication lines, over which the network elements communicate data with each other.

Typically, one or more network facilities 202 facilitate inter-network communications. The network facilities 202 are typically connected to a backbone network 204 and other provider-managed networks. The network backbone 204 typically includes many more network elements interconnected in a relatively complex topology to form numerous circuits supporting numerous communication sessions. To facilitate communication over the network 200, network facilities 202 generally switch data between the networks connected to the network facilities (leased transport networks, the customer networks, and the providers own network), and/or provide connectivity to remote locations in either the metropolitan area, or to distant cities through the network backbone 204.

In the embodiment shown, one or more data centers 206 are in communication with the network facilities 202 to monitor the state of the network 200 by gathering data about telecom facilities and the network elements configured on the network. In some embodiments, the data center 206 employs one or more computing devices from which a user or application program can issue commands to the network elements around the network 200, and receive responses from the elements of the network. For example, the data center 206 can use the gathered data to identify problems and performance-related issues related to the network 200.

The network provider is typically a distributed organization. As such, telecom facilities 202 are generally located at multiple geographic locations, as are the various network elements on the telecommunications network 200. The data centers 206 may also be geographically distributed. Generally, but not necessarily, the network provider has several data centers 206 located at selected large metropolitan areas (e.g., Atlanta, San Jose, New York). Initial implementation of the network 200 typically involves choosing the network elements that are to be used and deploying the elements within the network according to network designs to meet communication needs.

After deployment of the network elements, for a variety of reasons, changes are often made to the topology of the network 200. Topology changes involve changes to the interconnections and/or configurations of network elements within the network 200. For example, at a network facility 202, one type of router may be replaced by another type. As another example, a new switch may be implemented into the network backbone 204 to increase the bandwidth connectivity of the network. As yet another example, the customer may incur changes through new orders, cancellations, or upgrades to the customer's network.

As such, over time the topology of the network 200 can change with numerous different network elements interconnected in numerous different configurations, both correct and incorrect. Changes that are made may not be documented, and the state of the topology of the network 200 can become unknown or only partially known if there is not a way to determine the topology. Beneficially, embodiments of the invention perform functions for discovering network topology and/or changes to network topology. Based on the discovered network topology, remedial action can be taken to improve the network operations.

To facilitate the topology discovery, the data center 206 employs a topology discovery engine 210 and an associated topology database 212. In one embodiment, the topology discovery engine 210 transmits a request for operational and connection information to least one network element over a communication link. In response, network topology information is received by the network topology discovery engine 210 by one or more elements of the network that provide information on the topology and operational state of the telecommunications network 200. The received information may then be stored in a network topology database 212 for use by the telecommunications network 200 and/or an operating entity of the telecommunications network. Exemplary functions of the topology discovery engine 210 are described in further detail below. In general, the topology discovery engine 210 may be implemented in one or more general-purpose or special-purpose computing devices.

Figure 3:
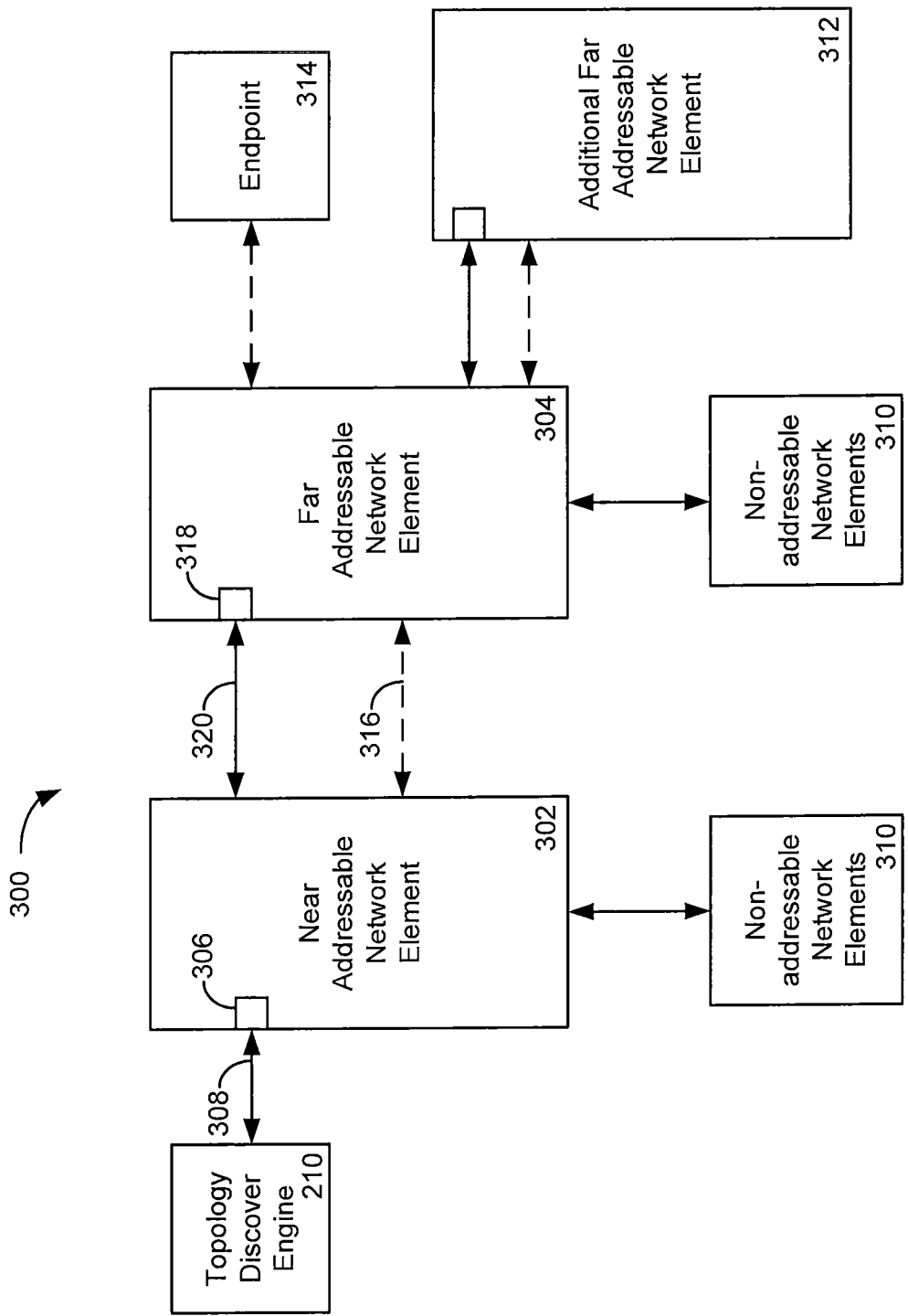
FIG. 3 is a block diagram illustrating an exemplary arrangement for utilizing a network topology discovery engine to identify one or more network elements of a telecommunications network.

FIG. 3 is a block diagram illustrating an exemplary arrangement for utilizing a network topology discovery engine 210 to identify one or more network elements of a telecommunications network 300. The simplified arrangement is intended for illustrative purposes. In an actual operating environment, the topology discovery engine 210 would be connected to or otherwise in communication with numerous network elements, which themselves would be connected to numerous other network elements in various configurations.

The arrangement of FIG. 3 includes a near network element 302 and a far network element 304. As used herein, the terms "far" and "near" are used in a logical, rather than physical, sense. Thus, the far network element 304 is not necessarily physically farther from the topology discovery engine 210 than the near network element 302. Rather, the near network element 302 is at a known address; i.e., the topology discovery engine 210 can readily communicate with the near network element to obtain information about the identity, configuration, and/or operating parameters of the near network element 302, as well as information for one or more network elements connected to or otherwise in communication with the near network element. Characteristics of the far network element 304, such as type, model, communication address and operating parameters, may not be known to the topology discovery engine 210 prior to topology discovery. Operations performed by the topology discovery engine 210 to obtain the information about the near network element 302, the far network element 304 and any other network element of the telecommunications network 300 are discussed in more detail below with regard to FIGS. 5 and 6.

To communicate with the near network element 302, the topology discovery engine 210 is in communication with an addressable communication port 306 associated with the near network element 302. The communication port 306 may be any communication port that is identifiable and accessible by an address. For example, the communication port 306 may be an external interface, such as Ethernet, which enables communications between the topology discovery engine 210 and the near network element 302. In another example, the communication port 306 may be a wireless communication port. In general, each addressable network element of the telecommunications network 300 includes some communication port over which communication with the element may occur.

Communication between the topology discovery engine 210 and the near network element 302, shown in FIG. 3 by communication arrow 308, may occur over many types of networks and communication types. For example, the communication 308 may occur within the telecommunications network in which the near network element 302 operates, may occur out of the network, or may occur both in-network and out-of-network. In another example, the communication may originate as a wireless communication, such as over a satellite, from the topology discovery engine 210 that is then received by and transmitted through a wired network. In general, any type of electronic communication for transmitting and receiving information may be utilized for communication between the topology discovery engine 210 and the near network element 302.

One or more non-addressable network elements 310 are also connected to the near network element 302. Non-addressable network elements 310 may include those elements of a telecommunications network that may not be directly communicated with through an addressable port. For example, one or more fiber optic cables may be connected to the near network element 310 to carry communications through the network. Other elements may be integral to the near network element 310 but are otherwise unaddressable. For example, the near network element 310 may include a power supply, laser components, communications ports, etc. that are utilized during operation of the element. However, these components of the near network element 302 are typically non-addressable such that information about the operation of these components is not available directly from the components themselves. As explained in more details below, information concerning the non-addressable network elements 310 connected to or otherwise associated with the near network element 302 may be gathered by the near network element in response to a request by the topology discovery engine 210.

Also connected to the near network element 302 are one or more far network elements 304. The characteristics of the far network element 304 may be similar to the near network element 302 such that the far network element may include an addressable communication port 318 that receives communications 320 from the near addressable network element, another network element, the topology discovery engine or any other computer-type device associated with the network. In addition, several communication lines 316 may connect the near network element 302 with the far network element 304 to carry network communications and create a portion of the telecommunications network. Additional far network elements 312 may also be connected to the far network element 304 in a similar manner. The connection of these elements in a manner that provides for the transmission of communications from one element to the next form the telecommunications network.

In addition to the communication connections between the elements that carry the traffic of the telecommunications network, information connections 320 may also be present such that topology and operational information may be transmitted between the elements. As such, the near network element 302 may request and receive operational and topology information from the far network element 304 apart from the communication traffic carried by the elements. Similarly, the far network element 304 may request and receive operational and topology information from the additional far network elements 312. In this manner, topology and operational information may be requested and received at the topology discovery engine 210 from the network elements of the telecommunications network.

In one embodiment, an endpoint 314, such as a local carrier or user's computer, for a communication being transmitted through the network may be connected to the far network element 304. As such, the network elements depicted in FIG. 3 form one or more paths for the communications carried by the telecommunications network. Also, one or more unaddressable network elements 310, similar to the unaddressable network elements described above, may be connected to the far network element 304 and/or the additional far network elements (not shown).

Figure 4:
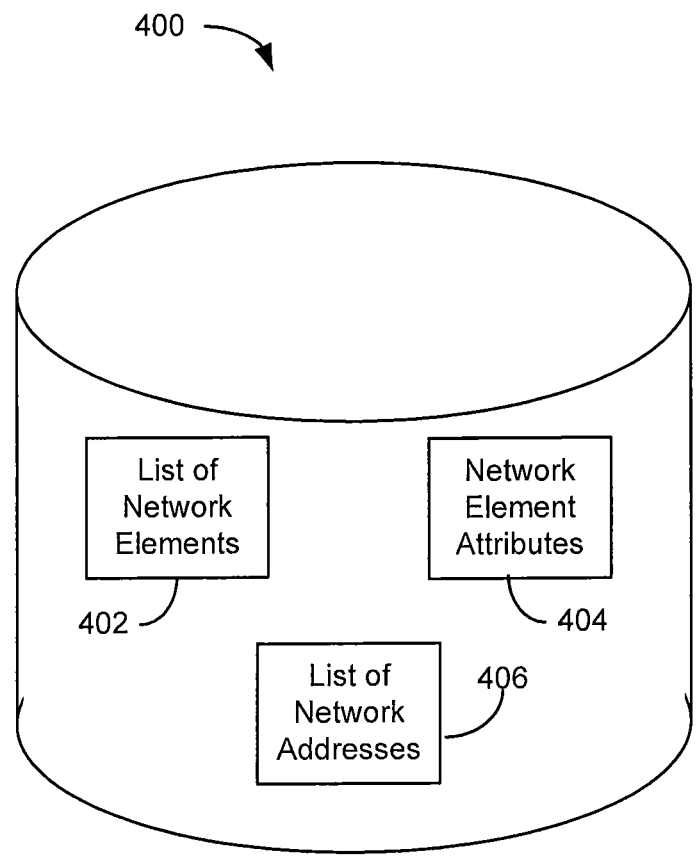
FIG. 4 is a diagram of a database storing information describing a topology of a telecommunications network.

FIG. 4 is a diagram of a database storing information describing a topology of a telecommunications network. In general, the network topology database 400 may store any information concerning a telecommunications network in any computer readable form. Thus, although the database 400 of FIG. 4 includes examples of the categories of information stored in the database, additional information concerning the telecommunications network may also be stored.

As shown, the database 400 may include a list of network elements 402 included in the telecommunications network. The list of network elements 402 may also include information associated with the network elements in the list. For example, the database 402 may further include the location of the network element (such as the longitude and latitude of the element and the specific location within the network facility), the logical location of the network element in the telecommunications network, including connection information to other network elements, communication port allocation for the provisioned ports of the network element, and the like. The database 400 may also include a list of attributes 404 associated with each network element listed in the network elements database 402. For example, operational information, such as average consumed power, available bandwidth, version number, time since last update, time since last reboot, and the like may also be stored in the database 400. This information may be associated with the list of network elements 402 such that at least some of the network elements in the list are associated with a set of attributes in the list of network attributes 404.

In addition, the network database 400 may include a list of network element addresses 406. In general, the list of network addresses 406 includes one or more addresses that are utilized to communicate with a network element. For example, the list of network addresses 406 may include an Internet Protocol (IP) address for one or more network elements. Another example may include a network element name that is recognizable by one or more computing devices as identifying that network element. In general, the addresses stored in the network address list 406 may be in any form that identifies one or more network elements within the network. As such, the list of network addresses 406 may be associated with the list of network elements 402 such that at least one of the network elements stored in the list of network elements can be accessed through information stored in the network database 400. Further, as explained in more detail below, the list of network element addresses may be ordered to facilitate network topology discovery.

Figure 5:
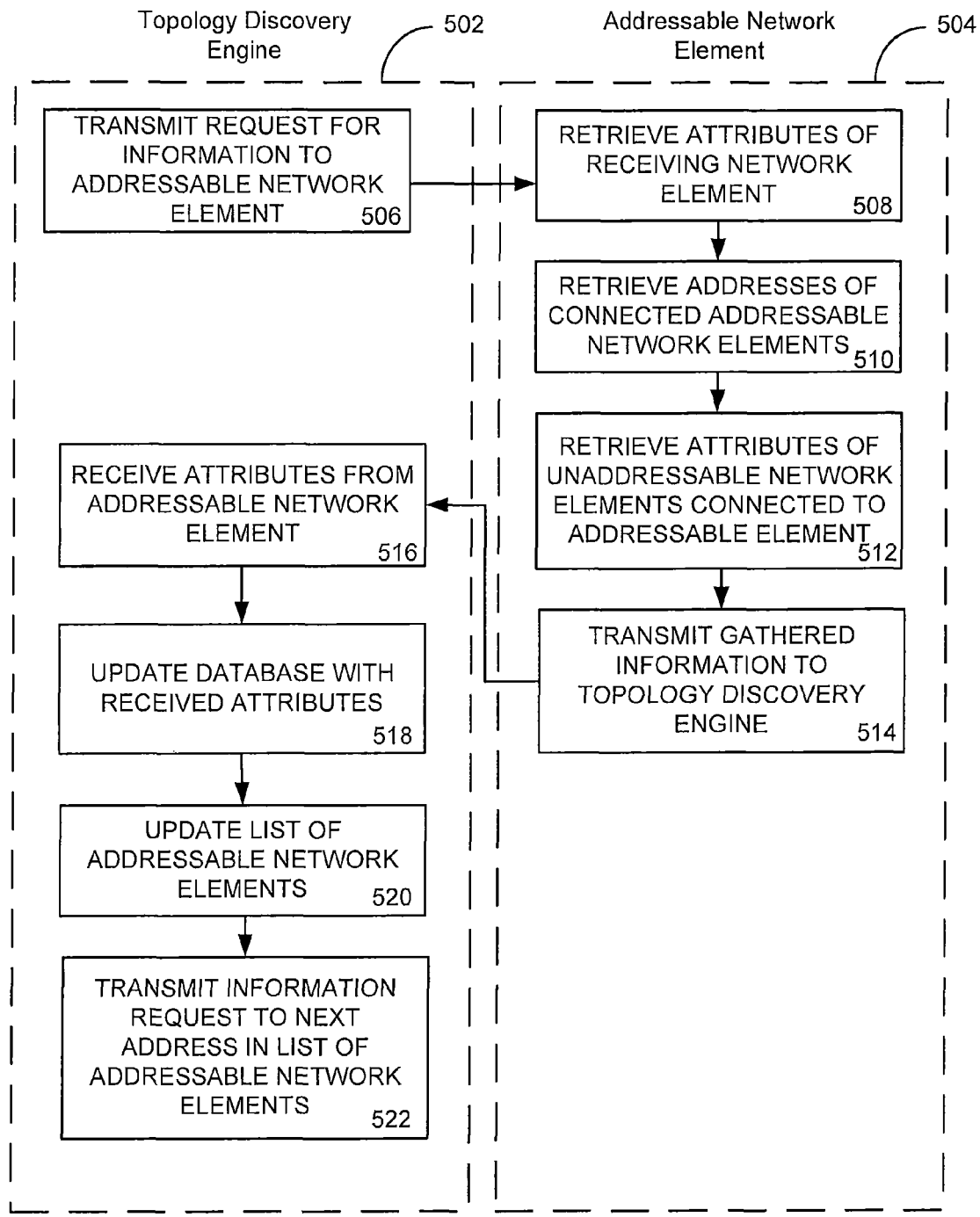
FIG. 5 is a flowchart illustrating a first embodiment of a network topology discovering algorithm that may be utilized by a network topology discovery engine.

Through the configurations above, a network topology discovery engine may communicate with one or more elements of a telecommunications network to request and receive information on the network to create a database describing the topology of the network. FIG. 5 is a flowchart illustrating a first embodiment of a network topology discovering algorithm that may be utilized by a network topology discovery engine. The operations of the method of FIG. 5 are discussed in relation to the configuration shown in FIG. 4. However, those of ordinary skill in the art will recognize that many other configurations exist that allow the network topology discovery engine to communicate with one or more network elements to receive information about the network. In general, any set-up for exchanging information between the topology discovery engine and the network elements may utilize the operations described below to discover the topology of a telecommunications network.

The operations illustrated in FIG. 5 are performed by the topology discovery engine and at least one addressable network element. In particular, the operations shown in dashed box 502 are performed by the topology discovery engine and the operations shown in dashed box 504 are performed by an addressable network element. Communication between the operations of boxes 502 and 504 occur over communication line 308 of FIG. 3.

Beginning in operation 506, the topology discovery engine 210 transmits a request for certain information to an addressable network element. The request may take any form that is recognizable by the addressable network element. For example, the request may take the form of an Extensible Markup Language (XML) query transmitted to an IP address associated with the network element. The XML request may include requests for particular types of information that, when received, is populated by the addressable network element. As such, the request for information may be tailored for specific topology or operational information concerning the network element. In another example, the request may take the form of a Windows Management Instruction (WMI) request. In general, any computer instruction or format that provides for the request of information from a computing device may be used in operation 506.

As discussed above, the topology discovery engine may transmit the request over any communication format to the addressable network element, including both wired and/or wireless formats. In addition, the topology discovery engine may obtain the address of the addressable network element from a list of such network elements. For example, the database 400 of FIG. 4 may include a list of network element addresses. To begin the network topology discovery, the topology discovery engine may select an address from the list, such as the first address in the list, and transmit the request to that address. In one embodiment, the lists of network element addresses stored in the database 400 may be further divided into categories or types. For example, the database 400 may maintain a list of addressable network elements for a particular client of the telecommunications network. In this example, the portion of the telecommunications that is utilized by the particular client may be discovered by accessing the list of network element addresses assigned to that client and transmitting one or more requests for information, such as in operation 506. In another example, the database 400 may maintain a list of addressable network elements of a particular type, such as all-known routers of the network. In yet another example, the list of addressable network elements may be stored based on geographic location. In general, the lists of network element addresses may be divided into any categories that may be useful to an administrator of the telecommunications network for maintenance and performance analysis of the network.

Regardless of how the network element address is determined, the transmitted request is received by the near network element 302 in operation 508 and the network element begins obtaining the requested information. In particular, the near network element 302 retrieves one or more attributes concerning the operational state and/or identification information for the network element. Such information may include the type of device, including vendor and serial number, loaded software version number, operational state (such as active, fault, warning, etc.), the average power consumed, the provisioned and available bandwidth, time since last failure, component health, and the like. It should be appreciated that the list of information provided above is for example only and those of ordinary skill in the art will recognize the numerous types of information that may be gathered by the network element upon receiving the request. Further, the types of information retrieved in operation 508 may be dependent on the types of information requested by the topology discovery engine in the request.

In operation 510, the near addressable network element 302 that receives the request for information determines and retrieves the addresses for far network elements 304 connected to the near addressable network element. As explained above, the telecommunications network 300 may include hundreds to thousands of elements interconnected to provide a path for communications. Thus, a near network element (such as element 302 of FIG. 3) is connected to a far network element (element 304) in some configuration to facilitate the transmission of communications through the network. In addition, the near network element 302 may also be connected to additional far addressable network elements as the telecommunications network grows. As such, to transmit communications to the far addressable network elements, the near network element 302 may maintain a list of such elements, in addition to a communication address for communicating with the far network elements. Thus, in operation 510, the addressable network element retrieves the addresses of those far addressable network elements connected to the near addressable network element.

In addition, the addressable network element retrieves one or more attributes for the unaddressable network elements connected to the addressable network element in operation 512. As also shown above with reference to FIG. 3, one or more unaddressable network elements 310 (such as power supplies, fiber optics and other network elements that cannot be accessed remotely) may be connected to the near addressable network element 302. Such unaddressable network elements 310 are typically managed by an addressable network element associated with element. For example, although a power supply of a router is not directly addressable, the power supply may be controlled and managed by the router. Thus, operational information, such as failures of the element, is typically received or can be obtained by an addressable network element. Thus, in operation 512, the addressable network element retrieves operational and topology information for unaddressable network elements connected to the element. For example, the addressable network element may transmit a test signal through any fiber optic cable connected to the element to detect any problems with the cables. In another example, the addressable network element may query a power supply device associated with the network element to determine proper operation of the power supply. Further, the addressable network element may maintain some type of information describing the connection of the unaddressable network elements to the addressable network element, such as a port configuration list or the like. In this manner, topology and operational information of the unaddressable network elements is retrieved by the addressable network element. The addressable network element may request such information from the unaddressable elements connected to the element, or may receive such information automatically from the unaddressable elements. Regardless of how the information is received at the addressable network element, such information is gathered by the network element in operation 514.

In operation 514, the addressable network element responds to the received in operation 508 by transmitting the information gathered in operations 508 through 512. More particularly, the addressable network element transmits to the topology discovery engine the attributes of the addressable network element, the addresses and topology information for any far addressable network element connected addressable network element and operational and topology information for any unaddressable network element associated with the addressable network element. However, the type and volume of information gathered and transmitted in operation 514 may be any type of information concerning the network elements. For example, the information may be dependent on the information requested in the request received in operation 508. For example, the received request may request only the addresses of the connected addressable network elements such that only the addresses of the connected elements are transmitted in operation 514. In general, the types and volume of information gathered and transmitted in operations 508 through 514 are configurable by the topology discovery engine.

The information transmitted by the near addressable network element in operation 514 is received at the topology discovery engine in operation 516. Such information may be transmitted on the communication link as the request was transmitted, or on a different communication link or network. Once received, the topology discovery engine may begin to update the network topology database accordingly with the received information.

In particular, in operation 518, the topology discovery engine updates the network topology database with the operational and topology information received. The information may be used to update the database 400 in several ways. For example, the database 400 may maintain a topology description of the telecommunications network, i.e., a description of the interconnectivity of the network elements as well as communication connections that carry the traffic of the network. To aid in this topology description, the topology discovery engine receives in operation 516 a description of the addressable and unaddressable network components connected to the network element, including addresses for the addressable network elements. In some instances, the received information may also include the type of connection, the bandwidth of traffic being divided among the connected elements and any empty communication ports. This information may be input into the topology database to create a topology of the network elements associated with the communicated with network element. In this manner, a topology diagram or description of the network may be built.

Further, several attributes, as discussed above, for the addressable network element may also be stored in the database in operation 518. In addition, these attributes are associated with the addressed network element in the database 400 such that operational configurations are accessible to a computing device connected to the database. Further, the operational attributes discussed above for an unaddressable network elements connected to the addressable network element may also be associated with those elements in a similar manner. In this way, information concerning the elements of the telecommunications network are associated with the elements included in the network topology description stored in the topology database 400.

In operation 520, the topology discovery engine may also update a list of addressable network elements stored in the database 400. As discussed above, the database 400 may include a list of addresses through which the addressable network elements of the telecommunications network are accessible. Thus, as new addresses of addressable network elements are received in operation 516, such addresses may be added to a list of network element addresses. In one embodiment, the addresses may be stored in an order of access such that new acquired addresses are stored at the end of the list. As explained more below, this list of addresses may be accessed in the order of storing to discovery the topology of the network.

As also explained above, the list of addresses of the addressable network elements may be sub-divided into lists of common configurations, such as a list of network elements included in a specific customer's network. Thus, in operation 520, several lists of addresses may be updated with the discovered addresses. For example, the addressable network element may return four addresses for network elements connected to the contacted element. However, only one of those four addresses belongs to a network element that forms a portion of the specific client's network. Thus, in addition to or apart from updating the master list of addresses, a list of addressable network elements for a specific client's network may also be updated with the address of the network element that meets the criteria for that list. Thus, the received addresses may be analyzed by the topology discovery engine to determine certain attributes of the network element associated with the received address to determine any sub-list of addresses that may be updated.

After updating the topology database, the topology discovery engine may transmit a new request to another addressable network element in the telecommunications network in operation 522. In one embodiment, the topology discovery engine may utilize at least one list of network element addresses and transmit the new request to the next address contained in the list. After transmission of the new request, the above describe operations may be repeated such that the topology discovery engine receives topology and operational information for another network element. In this manner, by working through lists of network element addresses, a portion or the entire telecommunications network can be discovered by the engine and stored in the network topology database.

As should be appreciated, not every operation discussed above in relation to FIG. 5 need to be performed for network topology to occur. Rather, one or more of the operations may occur automatically or may be skipped altogether. For example, the gathering of information in operations 508 through 512 may be performed periodically by the network elements to maintain an up-to-date database of information. Thus, upon a request for information from the topology discovery engine, the network element may respond with some or all of the stored information. Similarly, the network elements may be configured to self-report the gathered information periodically or at a set time for updating of the network topology database, without a direct request from the topology discovery engine. In addition, network topology discovery may occur at differently for different portions of the telecommunications. For example, one portion of the network may be discovered by request only, while other portions may self-report topology information periodically. In another example, the network elements may be configured to report topology information when any update or change to the element occurs.

Figure 6:
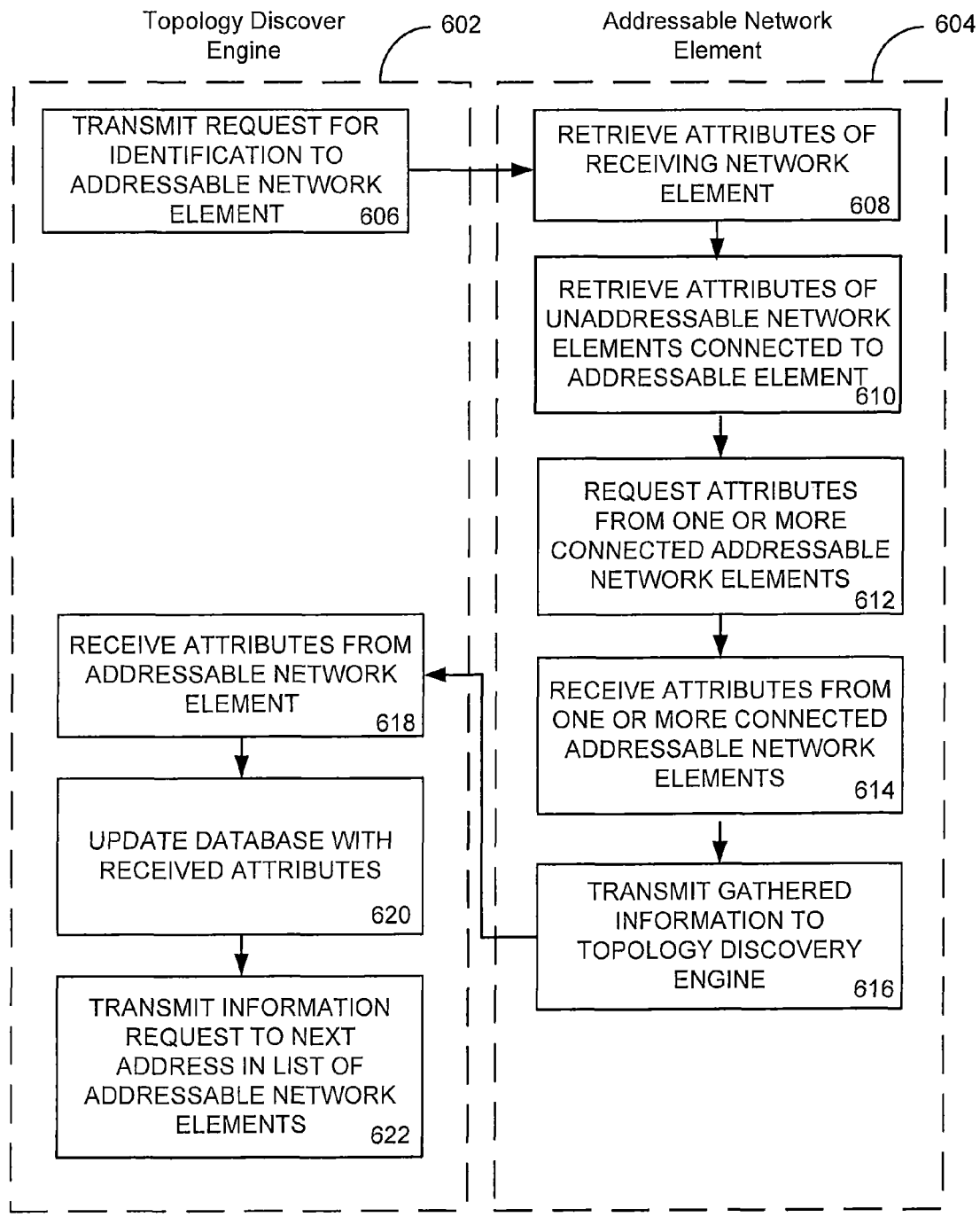
FIG. 6 is a flowchart illustrating a second embodiment of a network topology discovering algorithm that may be utilized by a network topology discovery engine.

FIG. 6 is a flowchart illustrating a second embodiment of a network topology discovering algorithm that may be utilized by a network topology discovery engine. Several of the operations of the method of FIG. 6 are similar to the operations discussed above with reference to FIG. 5. As such, reference to the description of similar operations included above is referred to below.

The method of FIG. 6 begins with the topology discovery engine transmitting a request to an addressable network element for topology and operational information in operation 606, similar to operation 506 above. Thus, the request may be specified for particular types of information about the network, or may be for all available information about the network. In operation 608, the near addressable network element receives the request and gathers operational information of the receiving network element, similar to operation 508 above. Further, similar to operation 512 above, the near addressable network element gathers topology and operational information for one or more unaddressable elements connected to the near addressable network in operation 610.

However, different from the method of FIG. 5, the near addressable network element transmits an additional request to one or more far addressable network elements in operation 612 to request topology and operational information from the one or more far addressable network elements. In one embodiment, the request transmitted by the near network element to the far network element is in the same format as the request transmitted by the topology discovery engine to the near network element. In other words, the near network element may act as a topology discovery engine for those addressable far network elements connected to the near network element. Also similar to the topology discovery engine request, the request sent by the near network element to the one or more far network elements may be tailored for specific information or may request all topology and operational information available to the far network element.

As mentioned, the near network element may transmit a request for topology and operational information from one or more far network elements connected to the near network element. In one embodiment, the near network element transmits the request to all known far addressable network elements to retrieve information from all known connected far network elements. In this manner, the near network element may gather topology information from the far network elements, relieving the topology discovery engine from requesting the information from the far network elements directly. Further, in one embodiment, the far network elements may gather topology and operational information in the same manner as described above, such that the far network element receives attribute information for the far network element, topology and operational information for any unaddressable network element connected to the far network element, and/or the addresses for any addressable network elements connected to the far network element. Such information is then transmitted to the near network element in operation 614 for storage by the near network element.

In another embodiment, the request for information may be repeated through several layers of the network. Referring again to FIG. 3, in this embodiment a request for topology information originates at the topology discovery engine 210 and is transmitted to the near network element 302. In response, the near network element 302 is configured to transmit its own request to the far addressable network element 304 to gather the requested information. Further still, the far addressable network element 304 is also configured to transmit a request to additional far addressable network elements 312 for topology and operational information for the additional far addressable network elements. Such a request for topology and operational information may cascade through any number of layers of network elements from the near addressable network element 302. Thus, the number of layers that the request for information is transmitted through the network may be configured into the network or into the request transmitted by the topology discovery engine. In addition, because each network element may communicate a request to a plurality of connected addressable network elements, the information request may branch to encompass many addressable network elements from the near network element, dependent on the topology of the network. Thus, the network topology and operational information may be gathered by any number of network elements before being transmitted to the topology discovery engine for storing in the network database.

As mentioned, the number of layers that the information request propagates through the network is configurable. For example, the request for information may be transmitted as far as the additional far network elements 312. As should be appreciated, the amount of topology and operational information that may be returned to a network element through just a few iterations of the information request through the network may be substantial. Thus, to control the amount of topology and operational information being gathered by any one network element, the request for information may be tailored to propagate through only a few layers of network elements. In another embodiment, the request is tailored to be transmitted to only those network elements that meet a certain criteria, such as network elements included in a particular customer's network or a particular type of network element. Also, to prevent the duplication of information from a network element, a token system may be utilized such that once a network element has returned information to a requesting network element, a token is set indicating that the information has been returned such that any additional requests for information are ignored for that particular set of requests.

Through this request for information cascading through the layers of the network, the near network element receives topology and operational information for a portion of the telecommunications network. As such, the near network element (as well as one or more of the far network elements) performs the functions of the topology discovery engine for a portion of the telecommunications network. In this manner, the topology of the network may be discovered with only a few requests sent from the topology discovery engine. Returning to FIG. 6, all of the information received by the near network element is transmitted to the topology discovery engine in operation 616. Upon receipt, the topology discovery engine updates the network topology database in operations 618 and 620 in a similar manner as described above with reference to FIG. 5. However, it should be appreciated that the information received in operation 618 includes much more network information as the information for several layers of network elements is included, rather than information for a single network element that occurs from the method of FIG. 5. Thus, through the use the method of FIG. 6, the network topology is discovered in less time. Upon updating the network topology database, the topology discovery engine sends an additional request to another addressable network element in operation 622. In one embodiment, the topology discovery engine may determine that information for the next addressable network element in the address list was not discovered through the cascading request described above, such as by searching for a token indicating that the information was already returned.

Through the methods described above, the topology of the telecommunications network, and more general information concerning the network, is discovered. In one embodiment, the topology discovery engine requests information from a first network element, receives information concerning that network element as well as address information for network elements connected to the first network element and adds those addresses to a list of network elements from which information is requested. In another embodiment, one or more network elements gathers information from several other network elements and transmits the stored information to the network topology discovery engine for storage in a database. In this embodiment, the topology discovery engine requests information from a small portion of the entire network to receive information for the entire network, as such information is already gathered by the network elements on their neighboring elements. In either case, the gathered information is retrieved by the topology discovery engine and stored in a network topology database that describes the topology and elements of the telecommunications network. Such information may be utilized by the network or an administrator of the network for various purposes where information on the network may be useful.

As mentioned above, the network topology database 400 includes information about a telecommunications network, including the elements of the network and attributes of the each element associated with the element. For example, the list of network elements may include the location of the network element (such as the longitude and latitude of the element and the specific location within the network facility), the logical location of the network element in the telecommunications network, including connection information to other network elements, communication port allocation for the provisioned ports of the network element, and the like. The list of attributes associated with each network element may include operational information, such as average consumed power, available bandwidth, version number, time since last update, time since last reboot, and the like may be stored in the database 400. This information may also be associated with the list of network elements such that at least some of the network elements in the list are associated with a set of attributes in the list of network attributes. This information may be input into the database manually or may be obtained through a network discovery scheme, such as described above. Regardless of how the information is input into the database, such information may be utilized by one or more monitoring programs to aid in the efficiency of the telecommunications network.

Figure 7:
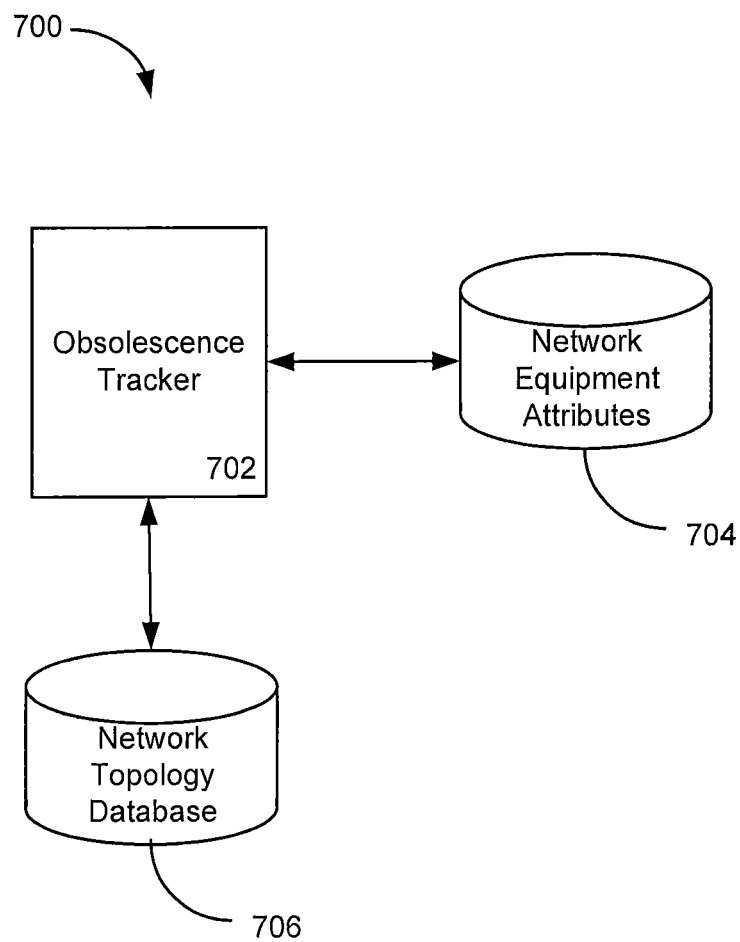
FIG. 7 is a block diagram illustrating an exemplary obsolescence tracker of a telecommunications network that detects obsolete or replaceable network elements.

One such monitoring program is described below with reference to FIGS. 7 and 8. In particular, FIG. 7 is a block diagram illustrating an exemplary obsolescence tracker configuration 700 of a telecommunications network that detects obsolete or replaceable network elements. In general, the obsolescence tracker may be a program that obtains information about one or more network elements (perhaps from a network topology database), analyze the element information in comparison to one or more variables that affect the cost of replacement or upgrading of the network element and determine if replacement of the network or maintenance on the network element should occur (or is cost effective). Upon detection of an obsolete network element, the obsolescence tracker may provide a notification of the obsolete element or a list of such obsolete network elements to a network administrator for consideration of replacement or upgrade.

The obsolescence tracker 702 is connected to or otherwise in communication with at least one database containing information of a telecommunications network. In particular, the obsolescence tracker 702 of FIG. 7 communicates with a database containing a network topology 706 and a database containing attributes for the elements of the network 704. Although depicted in FIG. 7 as separate databases, it should be appreciated that the information in the databases may be in a single database. Exemplary functions of the obsolescence tracker 702 are described in further detail below. In general, the obsolescence tracker 702 may be implemented in one or more general-purpose or special-purpose computing devices.

The network topology database 706 may include a description of a telecommunications network, including one or more of the network elements contained within the networks and the connectivity between the one or more network elements of the network. In one embodiment, the database 706 is populated manually by an administrator or operator of the network. In another embodiment, the network topology database 706 is populated automatically utilizing a network topology discovery engine, such as described above with reference to FIGS. 1-6. In any event, the network topology database 706 includes a list of one or more network elements of a network.

In addition, the network topology database 706 may also include information for each element listed that is particular to that element. For example, each element listed may include a location for that element, including a latitude and longitude location, a specific building address or network facility in which the element is housed, a specific location within the network facility the element is located (such as floor level, location on the floor, rack position, etc.) and the like. A logical location within the network may also be associated with the elements. For example, the partitioned and available communications ports of the elements, the connection of the element to other elements in the network and relative used and available communication bandwidth of the elements may be associated with the element. Further, other identifying information for each element may also be maintained, such as product number, version number, vendor, cost and the like. In general, any information that identifies a particular network element and the location of the network element within the network topology may be stored in the network topology database 706.

In addition, operational information for each element may also be stored in the network topology database 706. For example, an average power consumption of each network element may be stored in the database 706 and associated with the network element. Further, several instances of the average power consumed by the network element over a particular period of time may also be stored. Also, certain power considerations for the location of the network element may also be stored in database 706, such as the cost of electricity for that particular element. In general, any power consumption that aids the obsolescence tracker 702 to determine the cost of the power consumption of the network element may be stored in the database 706.

Other operational information may also be stored in the database 706. For example, an observed failure rate of the network element and/or components associated with the network element may be stored. Other information related to the durability of the element, such as the time since installation, manufacturers measured failure rate, time since last failure may also be stored. In addition, certain performance measurements of the network element that may indicate a drop in performance for the element may be monitored and stored in database 706. In general, any information that indicates the general health and durability of the network element may be stored in database 706. Further, failure information for one or more network elements connected to a particular network element may also be maintained in database 706 to aid in detecting an upcoming failure in peripheral devices associated with the network element.

Also in communication with the obsolescence tracker 702 is a database of network equipment attributes 704. In general, the network equipment attribute database 704 maintains information concerning network equipment that is either a network element (i.e., installed in the network) or may be a network element in the future. For example, for an existing network element, the network equipment attribute database 704 maintains general manufacturer information about the installation and/or operation of the equipment, such as the price of the device, the available bandwidth of the device, the technical details of the device, the power consumed and the like. In addition, as new equipment becomes available, the operating information for such information may also be input into the database 704. Thus, the cost of the new device, the available bandwidth, the power consumption and the like may also be stored in the database 704. As explained in more detail below, this information may be accessed and utilized by the obsolescence tracker 702 to determine when a network element may be replaced with an available new network element based on the operating information stored in the equipment attribute database 704.

With the information available in the databases, the obsolescence tracker 702 may utilize the information to determine if one or more of the network elements of a telecommunications network should be replaced with a new network element. FIG. 8 is a flowchart illustrating a method 800 for detecting one or more obsolete or replaceable network elements of a telecommunications network and providing notification of a detected network element.

Beginning in operation 802, the obsolescence tracker 702 retrieves attributes of one or more network elements. In general, the obsolescence tracker determines the obsolescence of one network element at a time. Thus, in operation 802, the obsolescence tracker 702 accesses the network topology database 706 to retrieve the information associated with a network element. The retrieved information may be any of the information outlined above, such as network element identification and operational information. In addition, this information may be reflective of the telecommunications network as updated from the topology discovery engine discussed above.

In operation 804, the obsolescence tracker 702 retrieves the attributes of one or more replacement elements that could replace the network element being analyzed. For example, the obsolescence tracker 702 may retrieve information on a router device deployed in the network in operation 802, the operation of which includes certain parameters, such as available bandwidth, power consumption and functions performed. Thus, in operation 804, the obsolescence tracker accesses the database 704 and selects a comparable device from the list of replacement elements. More particularly, the obsolescence tracker 702 determines if any of the replacement routers meet the qualifications of the router being analyzed such that the replacement router may replace the router under analysis in the network. Thus, some analysis of the performance parameters of the network element and the potential replacement element may occur in operation 804 to determine a proper replacement device. Once a replacement element is identified, information concerning the operational attributes of the replacement element is retrieved.

In operation 806, the obsolescence tracker 702 performs an analysis of the attributes of the network element and the replacement element to determine if replacement of the network element should occur. In general, the variables considered by the obsolescence tracker may be any information stored in the network topology database 706 and/or the equipment attributes database 704. For example, variables analyzed by the obsolescence tracker 702 in operation 806 may include the location of the network element (including the latitude longitude, the location within the network facility and the logical location), performance information of the network element, provisioned and available bandwidth of the network element, etc. In addition, the attributes of the replacement device identified in operation 804 may also be analyzed. During the analysis, the obsolescence tracker 702 determines a performance advantage gained by replacing the network element with the replacement device. In particular, the obsolescence tracker 702 may account for the cost savings in power consumed versus additional bandwidth made available by the replacement device. The obsolescence tracker 702 may also determine the potential for additional failures of the network element compared to the durability of the replacement device. In general, the obsolescence tracker in operation 702 during the analysis of the variables obtained determines if replacement of the network element is feasible based on network configuration and would provide a performance enhancement for the network. However, if the identified replacement element does not provide a performance enhancement for the network or does not meet the parameters of the network element, the obsolescence tracker 702 ceases the operations of the method 800 and returns to operation 802 to obtain the next network element for analysis.

In operation 808, if the obsolescence tracker 702 determines that the replacement element would provide a performance enhancement for the network, the obsolescence tracker 702 then determines the cost of replacement of the network element with the identified replacement device and compares the cost of replacement versus the savings gained from the inclusion of the replacement element. Several variables discussed above may affect the cost of replacement of the network element. For example, if the network element is located in a remote location, the cost of replacing that element is increased. Additionally, the logical location of the network element may also affect the cost. For example, a fully provisioned network element would require more installation time than a partially provisioned network element, resulting in a higher cost for the installation. Shipping costs for the replacement device also affects the cost of the installation. In general, any potential variable that affects the cost of replacing a network element with a replacement device may be considered in operation 808 by the obsolescence tracker 702.

Further, the cost determined in operation 808 may be compared with a cost savings determined in operation 806. As discussed above, the replacement device may provide a cost savings for the telecommunications network, including increased bandwidth and less power consumed. Thus, in operation 808, the obsolescence tracker compares the cost for replacement for a network element versus the cost savings achieved in the network by installing the replacement device. Again, this determination may involve any number of variables and considerations that affect the cost of replacement of the network element with the identified replacement device.

If the obsolescence tracker 702 determines that the analyzed network element should be replaced, a notification is sent in operation 810 to a network administrator or other type of network monitoring device to schedule the replacement of the network element. In one embodiment, the obsolescence tracker 702 transmits the notification upon detection of an obsolete network element. In another embodiment, the obsolescence tracker 702 compiles a list of each determined obsolete network element and transmits the list to the administrator at predetermined times, such as daily, weekly, hourly, etc. Further still, the obsolescence tracker 702 may sort the list of detected obsolete network elements based on calculated cost savings such that the network element replacement with the highest cost savings is included at the top of the list.

Also, the obsolescence tracker 702 may be configured to only report obsolete network elements that provide a cost savings over a threshold value. For example, the obsolescence tracker 702 may be configured to report only the replacement of a network element that provides $100,000 of savings to the network. In general, the notification provided by the obsolescence tracker 702 is configurable to tailor the notification in any manner as desired by the network or network administrator.

Figure 8:
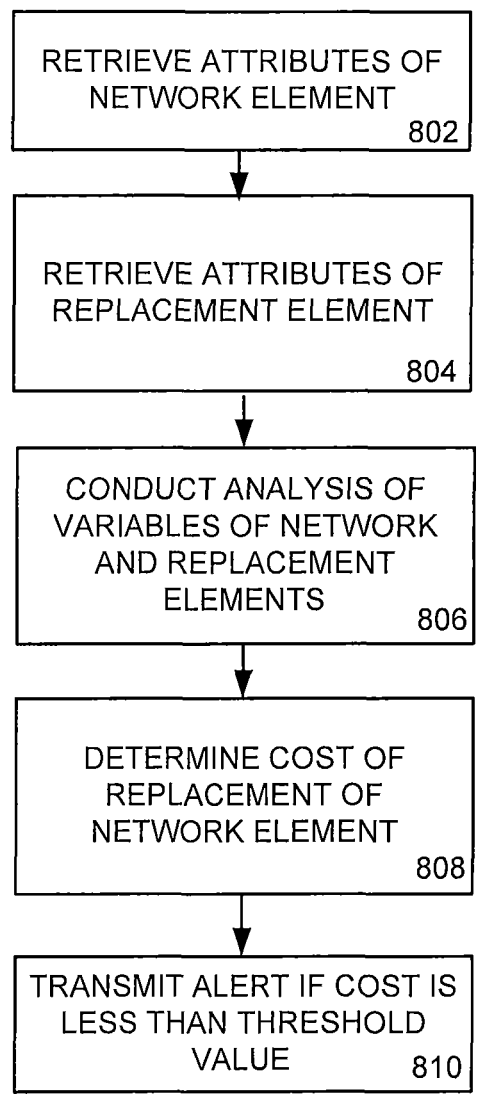
FIG. 8 is a flowchart illustrating a method for detecting one or more obsolete or replaceable network elements of a telecommunications network and providing notification of a detected network element.

Although not shown in FIG. 8, upon replacement of the network element, a topology discovery method may be performed on the network to include the newly added element to the network topology, as discussed above.

Figure 9:
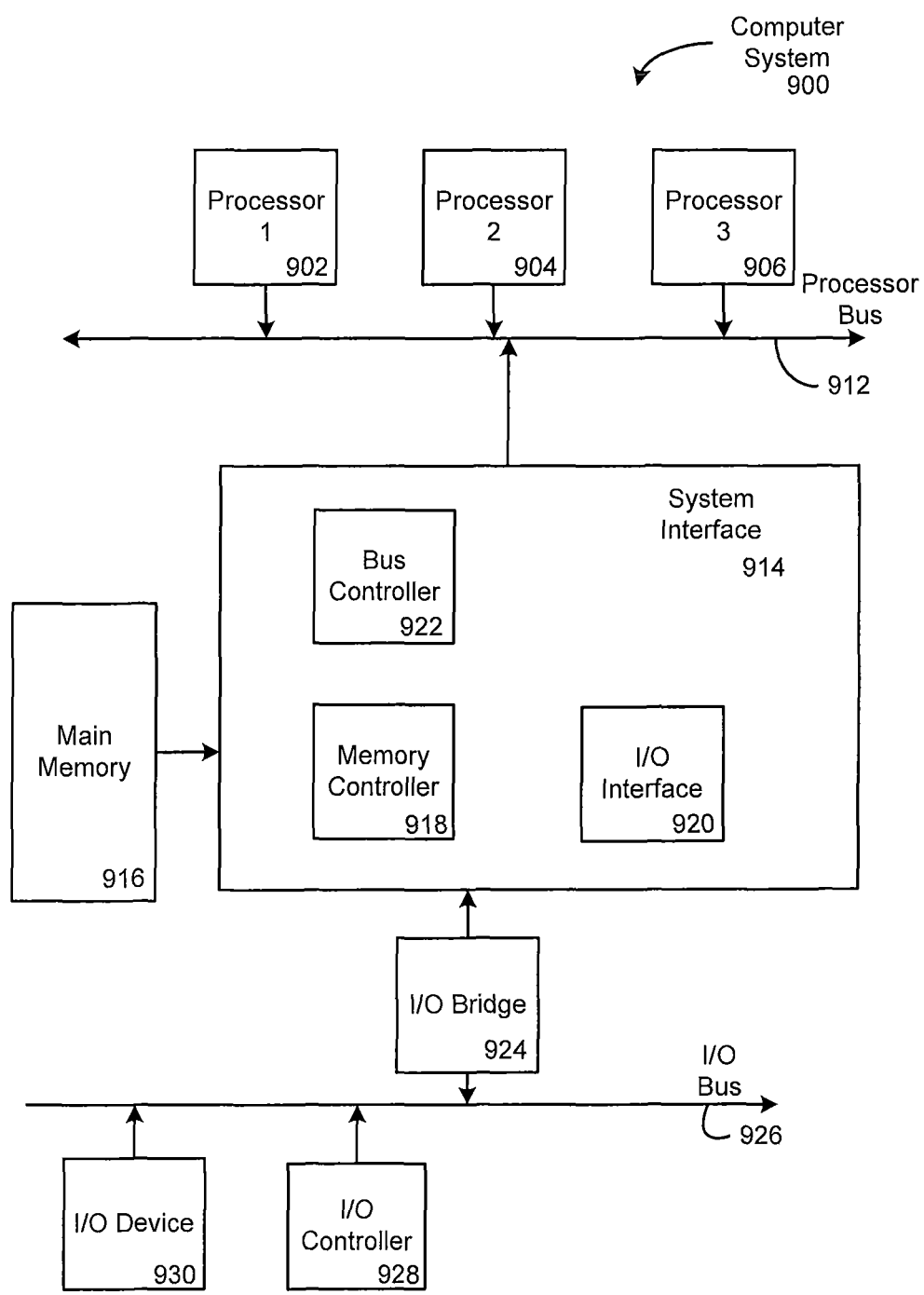
FIG. 9 is a block diagram illustrating an example of a computer system which may be used in implementing embodiments of the present disclosure.

FIG. 9 is a block diagram illustrating an example of a network topology engine, an obsolescence tracker or similar computer system 900 which may be used in implementing embodiments of the present disclosure. The computer system (system) includes one or more processors 902-906. Processors 902-906 may include one or more internal levels of cache (not shown) and a bus controller or bus interface unit to direct interaction with the processor bus 912. Processor bus 912, also known as the host bus or the front side bus, may be used to couple the processors 902-906 with the system interface 914. System interface 914 may be connected to the processor bus 912 to interface other components of the system 900 with the processor bus 912. For example, system interface 914 may include a memory controller 918 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912. One or more I/O controllers and/or I/O devices may be connected with the I/O bus 926, such as I/O controller 928 and I/O device 930, as illustrated.

I/O device 930 may also include an input device (not shown), such as an alphanumeric input device, including alphanumeric and other keys for communicating information and/or command selections to the processors 902-906. Another type of user input device includes cursor control, such as a mouse, a trackball, or cursor direction keys for communicating direction information and command selections to the processors 902-906 and for controlling cursor movement on the display device.

System 900 may include a dynamic storage device, referred to as main memory 916, or a random access memory (RAM) or other computer-readable devices coupled to the processor bus 912 for storing information and instructions to be executed by the processors 902-906. Main memory 916 also may be used for storing temporary variables or other intermediate information during execution of instructions by the processors 902-906. System 900 may include a read only memory (ROM) and/or other static storage device coupled to the processor bus 912 for storing static information and instructions for the processors 902-906. The system set forth in FIG. 9 is but one possible example of a computer system that may employ or be configured in accordance with aspects of the present disclosure.

According to one embodiment, the above techniques may be performed by computer system 900 in response to processor 904 executing one or more sequences of one or more instructions contained in main memory 916. These instructions may be read into main memory 916 from another machine-readable medium, such as a storage device. Execution of the sequences of instructions contained in main memory 916 may cause processors 902-906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 916. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 5, 6 and 8 are illustrative only. Alternative embodiments of the present disclosure may add operations, omit operations, or change the order of operations without affecting the spirit and scope of the present disclosure.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present invention. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for managing a telecommunications network, the method comprising:
  transmitting a request to a first network element of a telecommunication network, the request configured to request operational attributes of the first network element and the location of the first network element, wherein the location includes at least one of a geographic location and a location within a network facility site;
  receiving the operational attributes and location of the first network element;
  obtaining operational attributes of a replacement network element from a database, the operational attributes of the replacement network element including at least the available bandwidth of the replacement network element;

determining a cost savings of replacement of the first network element with the replacement network element, wherein the calculation of the cost savings includes the operational attributes and the location of the first network element and the operational attributes of the replacement network element; and providing a notification to an administrator of the telecommunications network when the cost savings of replacement of the first network element with the replacement network element exceeds a predetermined threshold value.

2. The method of claim 1 further comprising:
storing the operational attributes and location of the first network element in a network topology database, the network topology database configured to store topology information of the telecommunications network.

3. The method of claim 1 wherein the operational attributes of the first network element includes the average power consumed by the first network element, the provisioned bandwidth of the first network element, the cost of electricity at the location of the first network element, or the failure rate of the network element.

4. The method of claim 1 wherein the operational attributes of the replacement network element further includes the average power consumed by the replacement network element or the average failure rate of the replacement network element.

5. The method of claim 1 wherein the providing operation comprises:
accumulating a list of a plurality of network elements wherein the cost of replacement of the plurality of network elements exceeds the predetermined threshold value; and
transmitting the list of the plurality of network elements to the administrator of the telecommunications network.

6. The method of claim 5 further comprising:
sorting the list of the plurality of network elements based on at least a difference between the cost savings of replacement of the first network element with the replacement network element and the threshold value.

7. The method of claim 2 further comprising:
receiving operational attributes for a second network element from the first network element, the second network element connected to the first network element; and
storing the operation attributes for the second network element in the network topology database.

8. The method of claim 7 wherein the second network element is an unaddressable network element.

9. The method of claim 7 wherein the operational attributes for the second network element includes an address for communicating with the second network element.

10. A system for managing a telecommunications network, the system comprising:
a database configured to store topology information for a telecommunications network, the topology information comprising an identification of at least one network element, one or more operational attributes for the at least one network element and a geographic location of the at least one network element;
a processor; and
a computer-readable device associated with the processor and including instructions stored thereon and executable by the processor to:
retrieve the one or more operational attributes for the at least one network element and the geographic location of the at least one network element from the database;
obtain one or more operational attributes of a replacement network element, the operational attributes of the replacement network element including at least the available bandwidth of the replacement network element;
calculate a value of replacement of the first network element with the replacement network element, wherein the calculation of the value includes an analysis of the operational attributes and a remoteness of the geographic location of the first network element and the operational attributes of the replacement network element; and
transmit a notification to an administrator of the telecommunications network when the value of replacement of the first network element with the replacement network element exceeds a predetermined threshold value.

11. The system of claim 10 wherein the one or more operational attributes for the at least one network element stored in the database include the average power consumed by the first network element, the provisioned bandwidth of the first network element, the cost of electricity at the location of the first network element, or the failure rate of the network element.

12. The system of claim 10 wherein the database is further configured to store the one or more operational attributes of a replacement network element, including the available bandwidth of the replacement network element.

13. The system of claim 10 wherein the calculating instructions are further executable to:
determine the cost of labor associated with the replacement of the first network element with the replacement network element.

14. The system of claim 10 wherein the notification includes a list of a plurality of network elements wherein the value of replacement of the plurality of network elements exceeds the predetermined threshold value.

15. The system of claim 14 wherein the instructions are further executable to:
sort the list of the plurality of network elements based on at least a difference between the cost of replacement of the first network element with the replacement network element and the threshold value.

16. The system of claim 10 wherein the topology information for a telecommunications network stored in the database further comprises a plurality of identified network elements, one or more operational attributes associated with the plurality of identified network elements, and a plurality of addresses associated with the identified network elements that are addressable.

17. The system of claim 16 further comprising:
a topology discovery engine configured to obtain the topology information for the telecommunications network and stored the obtained information in the database.

* * * * *